(12) United States Patent
Aleman et al.

(10) Patent No.: US 12,033,107 B2
(45) Date of Patent: Jul. 9, 2024

(54) METHODS AND SYSTEMS FOR TRANSPORTATION DOCK MANAGEMENT

(71) Applicant: R & L Carriers, Inc., Wilmington, OH (US)

(72) Inventors: Rafael Aleman, Centerville, OH (US); Chris Deck, Wilmington, OH (US); Ronald F. Galason, New Lenox, IL (US)

(73) Assignee: R & L Carriers, Inc., Wilmington, OH (US)

( * ) Notice: Subject to any disclaimer, the term of this patent is extended or adjusted under 35 U.S.C. 154(b) by 0 days.

(21) Appl. No.: 17/822,636

(22) Filed: Aug. 26, 2022

(65) Prior Publication Data

US 2022/0414585 A1 Dec. 29, 2022

Related U.S. Application Data

(62) Division of application No. 15/605,479, filed on May 25, 2017, now Pat. No. 11,461,729.

(51) Int. Cl.
*G06Q 10/08* (2024.01)
*G06Q 10/083* (2023.01)

(52) U.S. Cl.
CPC ........... *G06Q 10/083* (2013.01); *G06Q 10/08* (2013.01)

(58) Field of Classification Search
CPC .............................. G06Q 10/083; G06Q 50/28
See application file for complete search history.

(56) References Cited

U.S. PATENT DOCUMENTS 5,880,958 A 3/1999 Helms et al.
6,148,291 A 11/2000 Radican
(Continued)

FOREIGN PATENT DOCUMENTS

EP 1501028 A1 1/2005
EP 2335838 A1 6/2011
(Continued)

OTHER PUBLICATIONS

Goddefroy, N., Mellaerts, A., & Raa, B. (May 21, 2013). Optimizing the dock door assignment problem in cross-docking warehouses: Semantic scholar. Retrieved Nov. 28, 2022, <https://libstore.ugent.be/fulltxt/RUG01/002/062/294/RUG01-002062294_2013_0001_AC.pdf> (Year: 2013).*

(Continued)

*Primary Examiner* — Shannon S Campbell
*Assistant Examiner* — Christopher Gomez
(74) *Attorney, Agent, or Firm* — Dinsmore & Shohl LLP

(57) ABSTRACT

Dock management systems including a dock management server communicatively coupled to a mobile computing device are disclosed. The dock management server generates a work assignment based on a first location for an item and a final location for the item, transmits the first work assignment to the mobile computing device, receives a location of the mobile computing device, and associates the location of the mobile computing device with a current location of the item. The work assignment includes instructions to move the item from the first location to a second location. The second location may be a temporary holding area between the first location and the final location. Methods for assigning dock doors to arriving transportation vehicles are also disclosed.

11 Claims, 6 Drawing Sheets

(56) References Cited

U.S. PATENT DOCUMENTS

| | | | |
|---|---|---|---|
| 6,332,098 | B2 | 12/2001 | Ross et al. |
| 7,085,775 | B2 | 8/2006 | Short, III et al. |
| 7,798,402 | B2 | 9/2010 | Bochicchio |
| 7,925,514 | B2 | 7/2011 | Williams et al. |
| 8,249,910 | B2 | 8/2012 | Wellman et al. |
| 9,796,529 | B1 * | 10/2017 | Hoareau .............. G05D 1/0282 |
| 2006/0261164 | A1 | 11/2006 | Bochicchio |
| 2007/0067200 | A1 | 3/2007 | Patel |
| 2014/0374478 | A1 | 12/2014 | Dearing et al. |
| 2015/0081360 | A1 | 3/2015 | Sun et al. |
| 2016/0232483 | A1 * | 8/2016 | London .............. G06Q 10/0833 |
| 2017/0225902 | A1 * | 8/2017 | Harper ................ G06Q 10/087 |
| 2018/0025460 | A1 * | 1/2018 | Watanabe .............. G06Q 50/28 |
| | | | 705/28 |

FOREIGN PATENT DOCUMENTS

| | | | | |
|---|---|---|---|---|
| EP | 2535850 | A1 | | 12/2012 |
| KR | 2016138820 | A * | 12/2016 | ............. G06Q 10/08 |
| KR | 2017071162 | A * | 6/2017 | ............. G06F 19/00 |
| WO | 2011038018 | | | 3/2011 |

OTHER PUBLICATIONS

Rodolfo Dondo, Jaime Cerda, "A sweep-heuristic based formulation for the vehicle routing problem with cross-docking," Computers & Chemical Engineering, vol. 48, 2013, pp. 293-311, ISSN 0098-1354, https://doi.org/10.1016/j.compchemeng.2012.09.016. (Year: 2013).*

Planning Labor Demand for Outbound, available at http://help.sap.com/SCENARIOS-BUS2013H2/helpdata/EN/68/\A475225EDD030E10000000A44538D/content.htm, accessed May 14, 2015, 8 pages.

"Reducing Labor Costs in an LTL Crossdocking Terminal," John J_ Bartholdi, III, et al., available at www.isye.gatech.edu/~jjb/papers/111-layout.pdf, Feb. 3, 2000, 36 pages.

"Freight Sequencing to Improve Hub Operations in the Less-Than-Truckload Freight Transportation Industry," Kiangshang Tong et al., available at www.mhi.org/downloads/learning/cicmhe/colloquium/2010/ellis.pdf, Aug. 23, 2010, 15 pages.

"An Optimal Solution to a Dock Door Assignment Problem," Louis Y. Tsui et al., Computers & Industrial Engineering J3:283-286 (1992), 4 pages.

"A Microcomputer Based Decision Support Tool for Assigning Dock Doors in Freight Yards," Louis Y. Tsui et al., Computers & Industrial Engineering 19:309-312 (1990), 4 pages.

Fluensee RFID Yard Management System, {www.fluensee.com/yard.html), accessed Sep. 16, 2013, 2 pages.

TotalTrax Forklift Tracking, {http://totaltraxinc.com/index.php/smart-forklifl-solutions/forklifl-tracking), accessed May 25, 2017, 2 pages.

Trebilcock, Bob, Fleet Management Software: The Smarter Lift Truck, {http://www.mmh.com/article/ieet_management_software_the_smarter_lifl_truck/), Aug. 1, 2012, 5 pages.

CA Examiner Requisition dated Jun. 12, 2023 pertaining to CA application No. 2,998,003 filed Mar. 13, 2018, pp. 1-4.

* cited by examiner

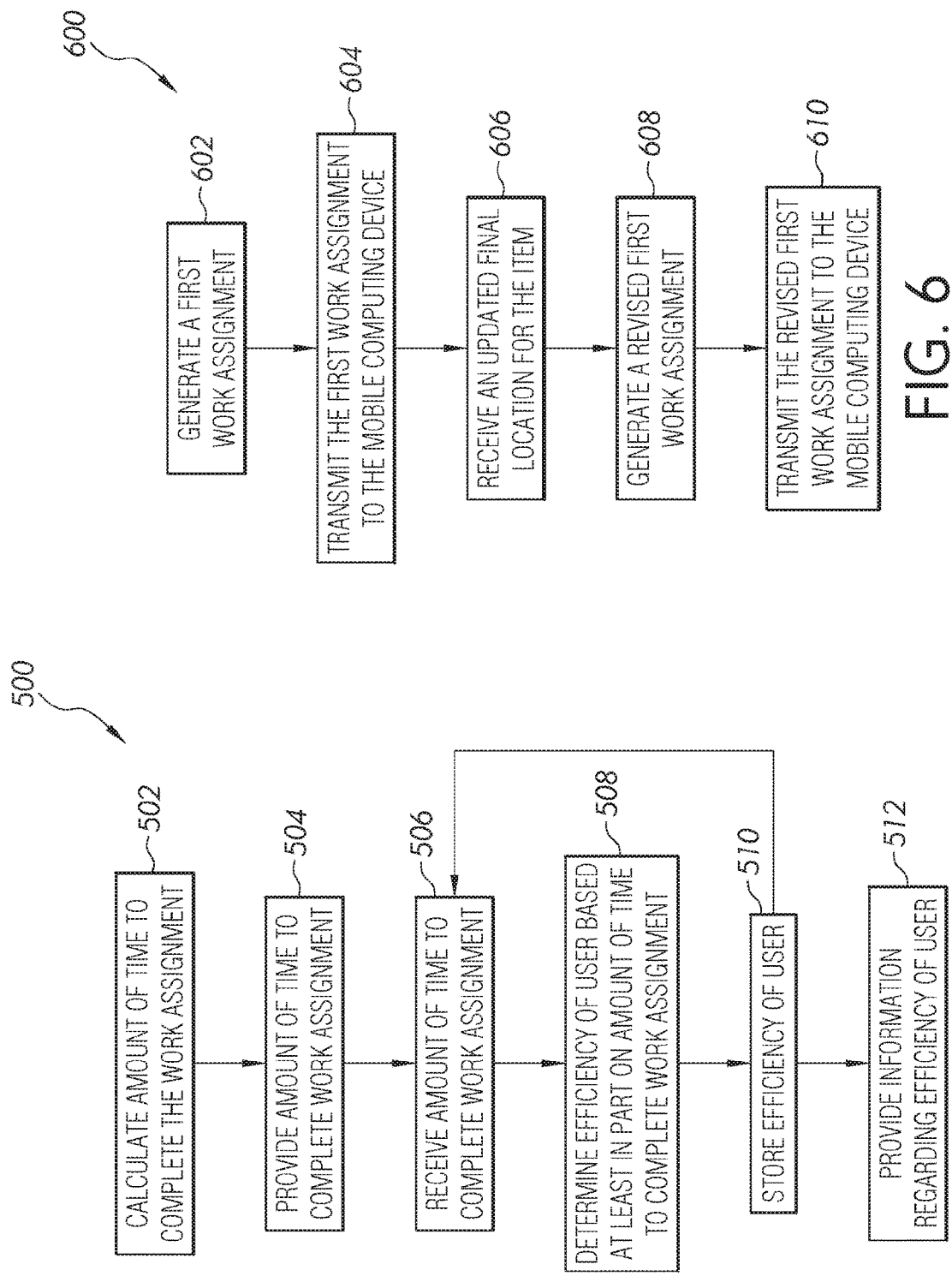

METHODS AND SYSTEMS FOR TRANSPORTATION DOCK MANAGEMENT

CROSS-REFERENCE TO RELATED APPLICATIONS

This application is a divisional application of U.S. Ser. No. 15/605,479, filed May 25, 2017, which is herein incorporated by reference in its entirety.

TECHNICAL FIELD

The present invention generally relates to methods and systems for transportation dock management and, more particularly, to methods and systems for managing the movement of items between locations at a transportation dock.

BACKGROUND

In the shipping industry, companies may fill trucks or trailers with freight loads that include freight designated for various destinations. For example, some items in the truck may be destined for California while other items in the truck may be destined for Ohio or Colorado. Accordingly, distribution facilities, shipping hubs, terminals or warehouses may be used to receive, consolidate, and distribute freight.

When shipments arrive at the distribution facility, each package or pallet (referred to as an "item") is checked in, sorted, and put on the next truck for its intended destination. Workers who are responsible for sorting these items must be kept informed as to where to find the item, and where the item should be moved to. Therefore, if there are changes, such as when a truck is re-assigned from one dock door to another, the changes must be communicated to the worker as rapidly as possible in order to prevent one or more shipments from being delayed and/or to prevent the item from being misplaced.

While conventional systems may provide instructions to workers to move an item from one location to another, such systems may not take into account worker efficiency and/or a total distance that a worker must travel to move the items. For example, one or two workers may be assigned to unload an entire trailer and move each item of freight from that trailer to the next trailer the item should be loaded on to. Depending on the location of each trailer, the workers may need to traverse the entire transportation dock, which may be acres in size.

Therefore, a need exists for alternative systems and methods to automatically provide instructions to move an item from one location to another to a worker.

SUMMARY

In one embodiment, a dock management system includes a dock management server communicatively coupled to a mobile computing device. The dock management server is configured to generate a first work assignment based on a first location for an item and a final location for the item, transmit the first work assignment to the mobile computing device, receive a location of the mobile computing device, and associate the location of the mobile computing device with a current location of the item. The first work assignment includes instructions to move the item from the first location to a second location. The second location may be a temporary holding area between the first location and the final location. The dock management server is also configured to determine that the current location of the item matches the second location. To generate the first work assignment, the dock management server processes on a processor computer-readable instructions that operate to minimize a total distance traveled by the mobile computing device.

In another embodiment, a dock management server includes one or more processing devices and a computer-readable medium. The computer-readable medium includes instructions for performing steps including generating a first work assignment, transmitting the first work assignment to a mobile computing device, receiving a current location of the mobile computing device, and associating the current location of the mobile computing device with a current location of the item. The first work assignment includes instructions to move an item from a first location to a second location based on the first location of the item, a final location of the item, an initial location of the mobile computing device, and a distance to be traveled by the mobile computing device. The computer-readable medium also includes instructions for determining whether the current location of the item matches the second location.

In still another embodiment, a dock management system includes a plurality of mobile computing devices and a dock management server. Each of the mobile computing devices includes a scanner, a location tracking unit, and a display device. Further, each mobile computing device is configured to receive a first work assignment including instructions to move an item from a first location to a second location, scan the item using the scanner, transmit the location of the mobile computing device using the location tracking unit, calculate an amount of time required to complete the first work assignment, and transmit the amount of time required to complete the first work assignment. The dock management server is communicatively coupled to the plurality of mobile computing devices and is configured to generate the first work assignment for each of the plurality of mobile computing devices, receive the location of each of the plurality of mobile computing devices, associate the location of each of the plurality of mobile computing devices with a current location of the item being moved by the corresponding mobile computing device, and determine that the current location of the item matches the second location. To generate the first work assignment for each of the mobile computing devices, the dock management server processes on a processor computer-readable instructions that operate to minimize a total distance traveled by each of the plurality of mobile computing devices.

In another embodiment, a dock management system includes a dock management server communicatively coupled to a mobile computing device. The dock management server is configured to receive information regarding a final location for each item in a plurality of items, calculate a centroid corresponding to an average location for the final location for each item in the plurality of items, receive information regarding a plurality of available loading doors, calculate a distance between a first of the plurality of available loading doors and the centroid, generate a door assignment for a transportation vehicle corresponding to the plurality of items based on the distance between the first available loading door and the centroid, and transmit the door assignment to the mobile computing device.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 5 schematically depicts an example method for determining an efficiency for a user of a mobile computing device in accordance with one or more embodiments;

FIG. 6 schematically depicts an example method for updating a work assignment in accordance with one or more embodiments;

DETAILED DESCRIPTION

The embodiments described herein generally relate to methods and systems for dock management and, more particularly, for managing the movement of items between dock locations.

Figure 1:
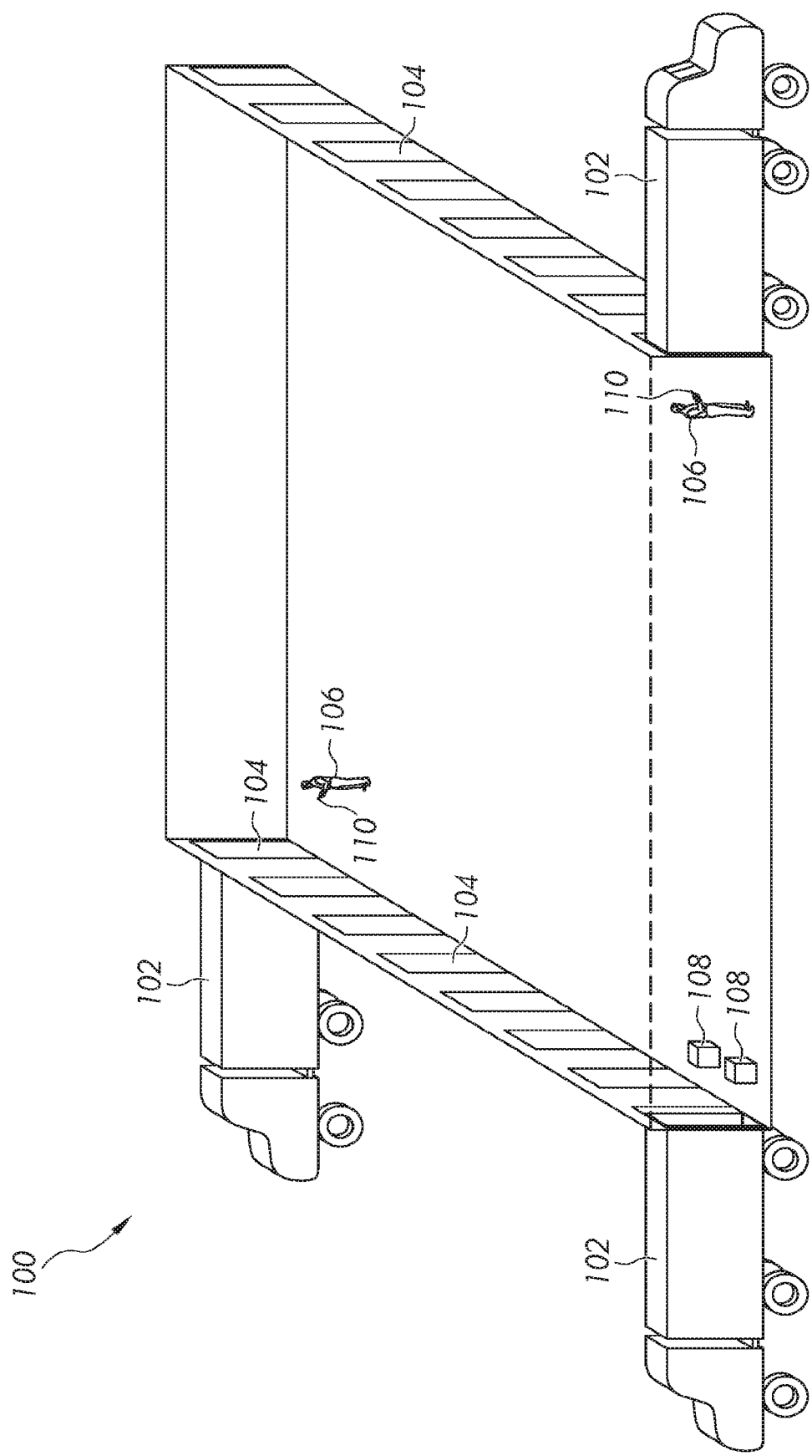
FIG. 1 schematically depicts an example environment for management by a dock management system in accordance with one or more embodiments.

FIG. 1 depicts an exemplary environment 100 for management by a dock management system (not shown). In general, the environment 100 is depicted as a transportation dock at which a plurality of loads 102 may be loaded and unloaded. As used herein, the term "transportation dock" or "dock" may include distribution facilities, shipping hubs, terminals, warehouses, and other locations at which freight may be received, consolidated, and distributed. The loads 102 may include, for example, a transportation vehicle (e.g., a tractor), a trailer, or cargo. Each of the loads 102 depicted in FIG. 1 is a transportation vehicle coupled to a single trailer, although it is contemplated that in some embodiments, one of the transportation vehicles may not be coupled to a trailer, or one or more of the transportation vehicles may be coupled to multiple trailers. In addition, it is contemplated that additional types of vehicles besides tractors may be employed, depending on the particular embodiment.

Each load 102 is depicted in FIG. 1 as being located at a dock door 104 of the dock. As will be discussed in greater detail below, door assignments may be determined by the dock management server (not shown in FIG. 1) and transmitted to the transportation vehicle as the transportation vehicle approaches the dock. After arriving at the dock door 104, the load 102 may be unloaded by one or more workers 106. In particular, each item 108 in the load 102 will be moved from a first location to at least a second location within the environment 100 by a worker 106.

Figure 2:
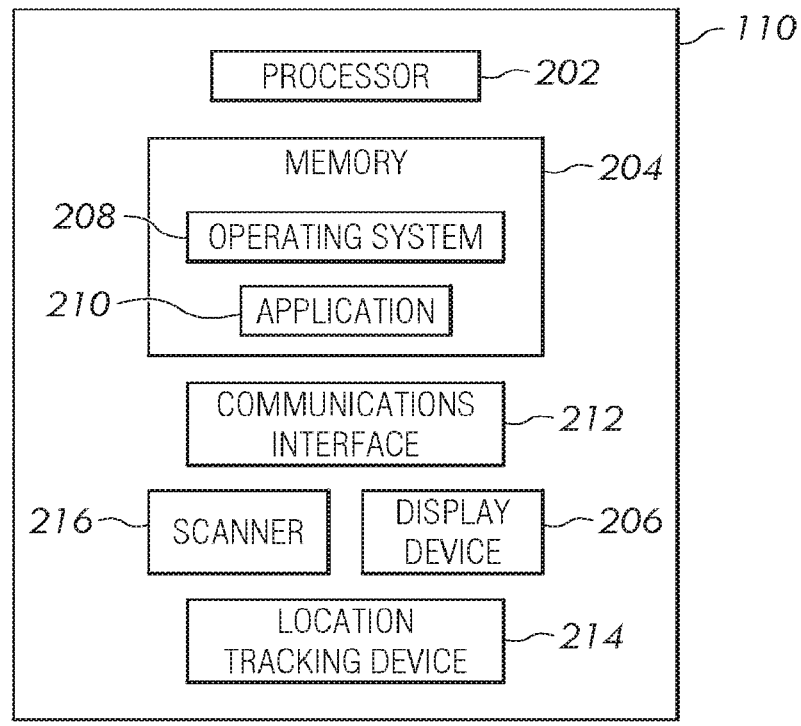
FIG. 2 schematically depicts an example mobile computing device in accordance with one or more embodiments.

In various embodiments, each worker 106 is equipped with a mobile computing device 110. The mobile computing device 110 may be any suitable mobile computing device, including but not limited to a mobile telephone (such as a smart phone), a tablet computing device (sometimes referred to as a slate computing device), a dedicated e-reader, a laptop computing device, a portable media player, or other suitable portable computing device. As shown in FIG. 2, the mobile computing device 110 includes a processor 202 and a memory 204, and the processor 202 executes instructions that are retained in the memory 204. The mobile computing device 110 may further include additional persistent storage (which can be a disk, flash memory, or other suitable data storage) and/or one or more interfaces that are configured to accept other storage devices (such as a memory card, a flash drive, etc.).

The processor 202 may include any processing component configured to receive information and execute instructions, such as from the memory 204. The processor 202 may include a semiconductor, transistors such as electronic integrated circuits, a controller, a microchip, or the like, and are not limited by the materials from which they are formed or the processing mechanisms they employ. While a single processor 202 is depicted, the processor 202 may be representative of multiple processors operable to perform various tasks associated with route management and transportation relay detection. Accordingly, the processor 202 may be a controller, an integrated circuit, a microchip, a computer, or any other computing device. The processor 202 is coupled to the other components of the mobile computing device 110 by a local interface (not shown).

The mobile computing device 110 additionally includes a display device 206. While the display device 206 is shown as being integral to the mobile computing device 110, it is to be understood that the display device 206 may be external to the mobile computing device 110, and may be coupled to the mobile computing device 110 by way of a suitable interface.

Although FIG. 2 depicts a single memory 204, it is contemplated that a wide variety of types and combinations of memory may be employed. The memory 204 may include, by way of example and not limitation, random access memory (RAM), flash memory, hard disk memory, video memory, removable medium memory, and other types of computer-readable media. As will be described in greater detail hereinbelow, the memory 204 may store code that is executable by the processor 202 to enable the mobile computing device 110 to perform various tasks associated with dock management, including work assignment processing and dock door assignment processing.

The memory 204 includes an operating system 208 that is executed by the processor 202. The memory 204 also includes one or more applications 210 that have been installed on the mobile computing device 110 and are designed to execute on the mobile computing device 110 in accordance with the operating system 208. The applications 210 can be any suitable type of applications, such as, by way of example and not limitation, word processing applications, social media applications, messaging applications, work assignment applications, and the like. The applications 210 may further include functionalities that enable the mobile computing device 110 to communicate with and/or facilitate operation of peripheral devices associated with the mobile computing device 110, such as display devices, printers, memory card readers, and the like.

The mobile computing device 110 also includes a communications interface 212, a location tracking device 214, and a scanner 216. Mobile computing device 110 is communicatively coupled to a dock management server 302 (shown in FIG. 3) via the communications interface 212. Accordingly, the communications interface 212 may include components that provide communication functionality, such as receiving and transmitting of information. The particular communications interface 212 employed will vary depending on the particular embodiment, and in general, enable the mobile computing device 110 to communicate with (e.g., transmit information to and receive information from) at least the dock management server 302. In some embodiments, for example, the communications interface 212 may include radio or other wireless communication components through which location data, route data, and other information can be transmitted. In one embodiment, the communications interface 212 may enable the mobile computing device 110 to communicate via a wireless network, such as Bluetooth®, Zigbee®, a wireless computer network (i.e., IEEE 802.11), or a cellular-data network, etc. It is contemplated that the communications interface 212 may enable the mobile computing device 110 to communicate via a combination of one or more networks.

The location tracking device 214 may be, by way of example and not limitation, a GPS receiver, cellular network radio, radio transmitter, or the like. In some embodiments, the location tracking device 214 may determine its location and transmit the location information, or it may transmit raw location data to another computing device, such as the dock management server 302, which may calculate the location of the location tracking device 214 using any suitable method. For example, the location tracking device 214 may be a GPS receiver which transmits its GPS coordinates to the dock management server. As another example, the location tracking device 214 may be a cellular network radio which transmits information to enable another computing device, such as the dock management server, to determine the location of the location tracking device 214 using cellular network triangulation. In still another example, the location tracking device 214 may be enabled to perform cellular network triangulation and transmit its location to the dock management server or another computing device. In other embodiments, the location tracking device 214 may utilize other types of indoor positioning systems and/or Bluetooth® beacons to determine its location. Accordingly, in various embodiments described herein, the location may be transmitted as location data from which the location of the mobile computing device 110 may be determined or as the location, which has been determined by the location tracking device 214 and/or the mobile computing device 110.

In embodiments, the location tracking device 214 transmits the location data to the dock management server 302 through the communications interface 212. However, it is contemplated that in some embodiments, the location tracking device 214 may include wireless communication components to enable the location tracking device 214 to communicate directly with the dock management server 302. Accordingly, the location tracking device 214 may communicate with the dock management server 302 directly or indirectly, depending on the particular embodiment.

Although various embodiments of the mobile computing device 110 are described as including a location tracking device 214 to determine a location of the mobile computing device 110, in some embodiments, the location of the mobile computing device 110 may be manually input, such as by a user of the mobile computing device 110. The location of the mobile computing device 110 may be input using a user interface, which may be, by way of example and not limitation, a touch screen, a microphone, a keyboard, or another user input device. Moreover, the form of the location input by the user may vary depending on the particular embodiment. For example, in some embodiments, the user may input coordinates or a code corresponding to a particular location (e.g., a unique identifier or a name of a location, such as "Door 21"), while in other embodiments, the user may select a location on a map corresponding to a present location of the user and the mobile computing device 110.

The scanner 216 is used to scan one or more items to be moved within the transportation dock environment. In some embodiments, the scanner 216 may be in the form of a camera, imaging device, or other optical sensor capable of capturing image data pertaining to an item 108. For example, the scanner 216 may be used to scan a barcode on a label on the item 108 or photograph the item 108 for image processing. In other embodiments, the scanner 216 may be an RFID receiver configured to receive a signal from an RFID transmitter associated with the item 108. Thus, as used herein, the phrase "scan the item" includes scanning a barcode, label, tag, transmitter or the like associated with the item or scanning the item itself, such as by capturing an image of the item.

The scanner 216 generates scan data by scanning the item 108. "Scan data" may include, for example, image data, barcode data, data from an RFID tag, or the like. The scan data may be transmitted from the mobile computing device 110 to the dock management server 302. For example, image data or data from the RFID tag may be transmitted from the mobile computing device 110 to the dock management server 302 to enable the dock management server 302 to uniquely identify the item 108.

Although in various embodiments, the mobile computing device 110 is described as being associated with a user or worker 106, it is contemplated that in some embodiments, the mobile computing device 110 is incorporated into an autonomous machine, such as an autonomous forklift or other machine capable of receiving and transporting one or more items 108. When incorporated into an autonomous machine, the mobile computing device 110 may further be configured to perform a number of autonomous functions, including but not limited to, object recognition, movement, and the like.

The dock management server 302 may be remotely located from each of the loads 102. For example, the dock management server 302 may be located at a transportation terminal, a warehouse, a data center, in an office building, or the like.

The dock management server 302 generally includes one or more processors, a memory, a database, and communication components. The dock management server 302 may be configured in a variety of ways, such as a desktop computer, a mobile station, a wireless phone, and so forth. Moreover, the dock management server 302 may include one or more entities. For example, the dock management server 302 may be a single computing device or a plurality of computing devices, such as a server farm or cloud-based computing device. The one or more processors, memory, and communications components may be of the types described hereinabove as being suitable for use in the mobile computing device 110.

The database of the dock management server 302 maintains one or more libraries including dock door assignments for loads in a fleet, work assignments for each worker on the dock, and the like. In some embodiments, the database may be located on the dock management server 302, although it is contemplated that the database may be located remote from the dock management server 302 while remaining accessible to the dock management server 302. For example, the database may be an enterprise database management system or "cloud" hosted system, and the like, which may be electrically coupled to the dock management server 302 via a computer network, such as Ethernet or the Internet.

Figure 3:
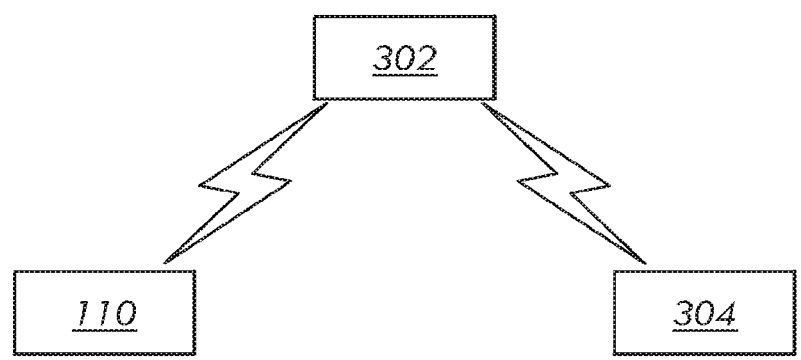
FIG. 3 schematically depicts an example dock management system in accordance with one or more embodiments.

In various embodiments, the dock management server 302 is communicatively coupled to various mobile computing devices 110 and to various loads in a fleet via mobile computing devices 304. Accordingly, the dock management server 302 may be configured to manage the routes for the fleet and provide route and status information to managers, drivers, and customers. More particularly, in various embodiments, each load in the fleet may be equipped with a mobile computing device 304 that is communicatively coupled to the dock management server 302, as shown in FIG. 3. Route information may include, by way of example and not limitation, an expected location, an estimated time of arrival (ETA) for the transportation vehicle at a particular location, previous or planned stop information, and the like. Route information may also include, for example, dock door assignments, as will be described in greater detail below.

Information may be provided to managers, drivers, and customers in a variety of ways, including displaying the information on a web page, providing a report, or causing the information to be displayed on a display device associated with the dock management server 302 or another computing device communicatively coupled to the dock management server 302. For example, information may be provided to workers and managers via the mobile communications device 110 assigned to them while information may be provided to drivers via the mobile communications device 304 associated with the load 102 the driver is driving.

In addition to managing route information for the fleet, in various embodiments, the dock management server 302 may generate work assignments for one or more workers based on the location of one or more items 108 to be moved and transmit the work assignment to the mobile computing device 110 of the corresponding worker.

Figure 4:
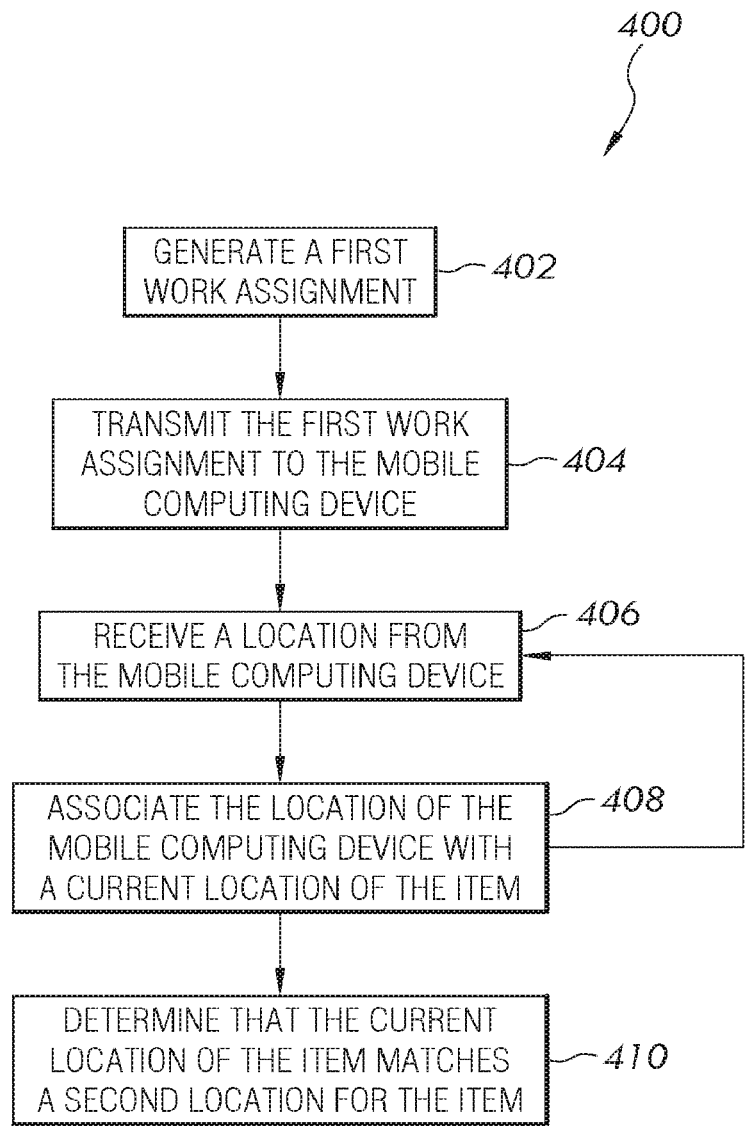
FIG. 4 schematically depicts an example method for generating and tracking work assignments in accordance with one or more embodiments.

FIG. 4 depicts an example method 400 that may be performed by the dock management server 302. In the method 400, the dock management server 302 generates a first work assignment at 402. The first work assignment may be, for example, instructions to move an item 108 from a first location (for example, from a first dock door within the environment 100) to a second location. In various embodiments, the second location is a temporary holding area between the first location and a final location for the item 108. The temporary holding area may be, for example, a runner bay, a staging area, another dock door, a pallet or forklift, or the like. The final location may be, for example, a second trailer or transportation vehicle, a dock door, or the like. In some embodiments, the final location is not the ultimate location for the item, but is the final location for the item within the environment 100. Accordingly, in various embodiments, the first work assignment is an instruction to move the item a portion (e.g., less then all) of the distance within the environment that the item needs to move.

The first work assignment may be generated by any of a number of suitable ways. In various embodiments, the work assignment is generated by processing computer-readable instructions on a processor of the dock management server 302. In some embodiments, the computer-readable instructions operate to minimize a total distance traveled by the mobile computing device 110. More particularly, the dock management server 302 may employ an algorithm that uses a first location of the item 108, a final location of the item 108, an initial location of the mobile computing device 110, and a distance to be traveled by the mobile computing device 110 to complete a possible work assignment to minimize the distance to be traveled by the mobile computing device 110. In embodiments, the computer-readable instructions may generate the work assignment based at least in part on a priority associated with the item 108. For example, a work assignment may be generated for an item 108 with a higher priority than a second item. In still other embodiments, the work assignment may be generated based on a combination of minimizing a total distance traveled by the mobile computing device 110, a priority associated with the item 108, and/or a number of other factors.

Next, the dock management server 302 transmits the work assignment to the mobile computing device 110 of the worker at 404. For example, the dock management server 302 may transmit the work assignment to the mobile computing device 110 via a wireless network operable within the environment 100. Once received by the mobile computing device 110, the mobile computing device 110 may communicate the work assignment to the worker. For example, the work assignment may be displayed on the display device 206 of the mobile computing device 110, played using an audio device, or the like. In some embodiments, one or more visual or auditory alerts may be used to alert the worker to the existence of a new work assignment. The worker may acknowledge receipt of the work assignment in various embodiments. For example, the worker may select a button displayed on a touch screen display device to indicate that he has read and/or started performing the work assignment, or the worker may scan the item 108 to be moved using the scanner 216 of the mobile computing device 110.

The dock management server 302 then receives a location of the mobile computing device 110 at 406. The "location" may be received as an actual location, or may be received as data sufficient to enable the dock management server 302 to determine a location for the mobile computing device 110. As but one example, the dock management server 302 may receive information sufficient to perform triangulation methods to determine a location of the mobile computing device 110. In various embodiments, the location of the mobile computing device 110 may be provided by the mobile computing device 110 responsive to the worker acknowledging the work assignment, such as when the worker scans the item 108 to be moved, or the location may be periodically transmitted to the dock management server 302 based on a predetermined time period. For example, the location of the mobile computing device 110 may be transmitted to the dock management server 302 every minute, every five (5) minutes, or every ten (10) minutes over the course of the day. Accordingly, in some embodiments, the location of the mobile computing device 110 is transmitted to the dock management server 302 independent of the receipt of a work assignment, while in other embodiments, the location of the mobile computing device 110 is transmitted to the dock management server 302 only after a work assignment is transmitted to the mobile computing device 110.

In various embodiments, the dock management server 302 associates the location of the mobile computing device 110 with a current location of the item 108 at 408. This can be performed in any suitable way. For example, the dock management server 302 may associate the location of the mobile computing device 110 with a location of the item 108 in a database or look up table. In some embodiments, the dock management server 302 may store other information pertaining to the item 108, such as the final location for the item 108, the second location for the item 108, a transportation route for the item 108, information regarding the shipper or receiver of the item 108, detailed information about what the item is, including information regarding hazardous or other potentially dangerous items, and the like. In some embodiments, the dock management server 302 may further associate with the item 108 image data pertaining to the item 108, image data pertaining to a barcode or label on the item 108, or other information regarding a tag associated with the item 108. It is contemplated that additional information pertaining to the item 108 may be associated with the item 108 and stored by the dock management server 302.

By associating the location of the mobile computing device 110 with the item 108, the dock management server 302 is able to determine a probable or actual location of the item 108 without the need to affix a location tracking device to the item 108 or the like. The current location of the item 108 may further be transmitted to another computing device, such as a mobile computing device assigned to a manager or supervisor, or a computing device that is remotely connected to the dock management server 302, such as a computing device of an owner of the item 108. Alternatively, in various embodiments, the dock management server 302 may be configured to cause data regarding the current location of the item to be displayed on a web page. For example, the owner of the item (or other user) may access a web page that includes a map indicating the current location of the item to enable the user to track the location of the item.

In various embodiments, the method 400 continues as new locations are received from the mobile computing device and are associated with the current location of the item until the dock management server 302 determines that the current location of the item matches a second location for the item at 410. For example, the dock management server 302 may compare the current location of the item to the second location for the item and determine that the current location of the item and the second location for the item match when the locations are within a predetermined distance from one another. A match may be determined when the current location is within less than one meter of the second location, when the current location is within less than 2 meters of the second location, when the current location is within less than 3 meters of the second location, when the current location is within less than 4 meters of the second location, when the current location is within less than 5 meters of the second location, or even when the current location is within less than 10 meters of the second location, depending on the particular embodiment.

Although the method 400 has been described with reference to a single mobile computing device, it is contemplated that the dock management server 302 may generate and transmit work assignments to each mobile computing device in a plurality of mobile computing devices. For example, the dock management server 302 may generate and transmit work assignments to greater than 5 mobile computing devices, greater than 10 mobile computing devices, greater than 20 mobile computing devices, greater than 30 mobile computing devices, greater than 50 mobile computing devices, or even greater than 100 mobile computing devices. The number of mobile computing devices to which the dock management server 302 transmits work assignments varies with the particular embodiment, and may depend on the capacity of the network to which the dock management server 302 is connected and/or the computational limitations of the dock management server 302, as will be understood by a person of skill in the art.

Moreover, it is contemplated that the dock management server 302 may determine when the first work assignment has been completed, and generate a second or subsequent work assignment for the worker. For example, the dock management server 302 may generate a second work assignment responsive to determining that the current location of the item matches the second location in method 400. Accordingly, the method 400 may return to 402 to generate a subsequent work assignment, and continue providing new work assignments responsive to determining that the previous work assignment has been completed.

In some embodiments, subsequent work assignments generated for a particular worker may be based at least in part on the location of the worker. For example, the second work assignment may include instructions to move a second, subsequent item from a location within a predetermined distance of the second location of the first item to a location within a predetermined distance of the first location of the first item. In other words, the second work assignment may be an instruction to take a second item from the location where the first item was dropped off to the location where the first item was picked up. The predetermined distance between the drop off location of the first item and the pick up location of the second item may vary depending on the embodiment, and may be about 1 meter, about 2 meters, about 3 meters, about 6 meters, about 10 meters, about 20 meters, or about 50 meters. Likewise, the predetermined distance between the drop off location of the second location and the pick up location of the first item may vary depending on the embodiment, and may be about 1 meter, about 2 meters, about 3 meters, about 6 meters, about 10 meters, about 20 meters, or about 50 meters.

In addition to, or as an alternative to, the second work assignment being generated based on the location of the worker, in some embodiments, the second work assignment may be generated based at least in part on an efficiency for the user of the mobile computing device.

Turning now to FIG. 5, a method 500 for determining an efficiency for a user of a mobile computing device is provided. As shown in FIG. 5, the mobile computing device calculates an amount of time to complete a work assignment at 502. This may be done in any one of a variety of ways, such as starting a timer when the work assignment is received by the mobile computing device or acknowledged by a user of the mobile computing device. In some embodiments, the time that the work assignment is received by the mobile computing device may be stored in a memory of the mobile computing device, a time that the work assignment is completed may be stored in the memory of the mobile computing device, and the mobile computing device may calculate an amount of time to complete the work assignment, sometimes referred to herein as a "time to complete the work assignment." The mobile device may determine that the work assignment has been completed by receiving a user input indicative that the user has completed the work assignment, receiving a subsequent work assignment from the dock management server, or receiving a determination that the work assignment has been completed from the dock management server.

At 504, the mobile computing device 110 provides the amount of time to complete the work assignment to the dock management server 302. For example, the mobile computing device 110 may transmit the amount of time to complete the work assignment to the dock management server 302 via the internet or other network through which the mobile computing device 110 and the dock management server 302 are communicatively coupled. At 506, the dock management server 302 receives the amount of time to complete the work assignment.

Although in method 500 the mobile computing device is described as calculating the amount of time to complete the work assignment, it is contemplated that in some embodiments the dock management server 302 may calculate the amount of time instead of the mobile computing device 110.

For example, start and end times for the work assignment may be transmitted to the dock management server 302 from the mobile computing device 110 and the dock management server 302 may calculate an amount of time to complete the work assignment based on the start and end times for the work assignment.

Regardless of how the dock management server 302 receives the amount of time to complete the work assignment (such as receiving it from the mobile computing device or calculating the amount of time itself), at 508, the dock management server 302 determines an efficiency of a user of the mobile computing device 110 based at least in part on the amount of time to complete the work assignment.

In various embodiments, the dock management server 302 may store the time to complete the work assignment in a database. For example, the dock management server 302 may store the time to complete the work assignment in a database associated with a user profile. Accordingly, user profiles may be created and updated for each user of a mobile computing device 110 coupled to the dock management server 302.

The dock management server 302 may use the time to complete the work assignment, with or without other information available in the user profile, to determine an efficiency for a user. Other information that may be utilized to determine the efficiency for the user may include information related to the priority of the work assignment, information regarding a distance to complete the work assignment or the like.

At 510, the efficiency of the user is stored by the dock management server 302. For example, the efficiency may be stored as part of the user's profile in the database. Moreover, efficiencies may be updated for each mobile computing device 110, or user thereof, based on each subsequently completed work assignment by returning to step 506 of the method 500. For example, the dock management server 302 may use a user efficiency to generate a second work assignment for a user, receive an amount of time to complete the second work assignment ("a second time") from the mobile computing device 110, and update the efficiency using the second time.

In method 500, the dock management server 302 additionally provides information regarding the efficiency of the user of the mobile computing device 110 at 512. For example, the dock management server 302 may provide information regarding the efficiency of the user to a management device, or a mobile computing device assigned to a manager, supervisor, or the like. User efficiencies may be used, for example, to evaluate users and/or to generate second or subsequent work assignments. As but one example, a user with a high efficiency compared to other users may receive higher priority work assignments, or "better" work assignments than users with lower efficiencies. As another example, a second work assignment may be generated to maximize an efficiency of the user, such as by selecting a work assignment that requires the user to travel a short distance. In some embodiments, the second work assignment may be generated for a particular user based on computer-readable instructions that operate to maximize the efficiency for the users of each of the mobile computing devices.

In addition to creating subsequent work assignments for each mobile computing device 110, the dock management server 302 may provide updates to work assignments that have been transmitted to the mobile computing device 110.

FIG. 6 depicts an example method 600 that may be performed by the dock management server 302 to update work assignments.

In the method 600, the dock management server 302 generates a first work assignment at 602. The first work assignment may be, for example, instructions to move an item 108 from a first location (for example, from a first dock door within the environment 100) to a second location. In various embodiments, the second location is a temporary holding area between the first location and a final location for the item 108. The work assignment may be generated in any suitable way, as described in greater detail above and below.

Next, the dock management server 302 transmits the work assignment to the mobile computing device 110 of the worker at 604. For example, the dock management server 302 may transmit the work assignment to the mobile computing device 110 via a wireless network operable within the environment 100. Once received by the mobile computing device 110, the mobile computing device 110 may communicate the work assignment to the worker.

At 606, the dock management server 302 receives an updated final location for the item 108. For example, the dock management server 302 may receive information that the trailer or other transportation vehicle onto which the item 108 is to be loaded has been reassigned from an initial dock door to an updated dock door within the environment 100. The updated final location for the item 108 may be received from another computing device, or from a different process or module within the dock management server 302, such as a module that generates dock door assignments. In various embodiments, the updated final location for the item 108 is received after the user of the mobile computing device 110 has already begun performing the first work assignment, or after the user has acknowledged receipt of the first work assignment.

At 608, the dock management server 302 generates a revised first work assignment. In various embodiments, the dock management server 302 may generate a revised work assignment that includes instructions to move the item 108 from the first location to a third location based on the current location of the item 108, the updated final location of the item 108, and an updated distance to be traveled by the mobile computing device 110. The current location of the item 108 may be, for example, received from the mobile computing device 110 as described above. In various embodiments, the current location of the item 108, may be a location that differs from the first location, the second location, and the third location.

The dock management server 302 transmits the revised first work assignment to the mobile computing device 110 at 610. For example, the dock management server 302 may transmit the revised first work assignment to the mobile computing device 110 via the wireless network operable within the environment 100. The user may acknowledge receipt of the revised first work assignment, as described above, and may perform the revised first work assignment instead of the first work assignment transmitted at 604.

As described above, the dock management server 302 may generate and transmit work assignments to a plurality of mobile computing devices to which it is coupled. Accordingly, in some embodiments, after the dock management server 302 has generated a first work assignment that includes instructions to move an item 108 from a first location to a second location, the dock management server 302 may generate one or more subsequent work assignments to ensure that the item 108 is moved to its final location within the environment 100. In embodiments, the dock management server 302 may generate two or more work assignments regarding movement of the item 108 from a first location to a final location. In some embodiments, the dock management server 302 may generate two, three, four, or even five or more work assignments regarding movement of the item 108 from a first location to a final location within the environment 100.

In one particular embodiment, the dock management server 302 may generate the first work assignment to move an item 108 from a first location to a second location and transmit the first work assignment to a first mobile computing device 110. After receiving information that the first work assignment has been completed, the dock management server 302 may generate a subsequent work assignment to move the item 108 from the second location to a final location for the item 108 within the environment. The subsequent work assignment may be transmitted to a different mobile computing device in a plurality of mobile computing devices communicatively coupled to the dock management server 302 than the first mobile computing device. Accordingly, various embodiments enable an item to be moved from a first location to a final location within an environment by a plurality of workers to minimize a distance traveled by each of the workers. Such arrangements may increase the efficiency of item movement through the environment, as each worker is retained in a zone through which they transport items rather than being responsible for moving items through the entire environment.

In various embodiments described above, the dock management server 302 uses the final location of various items to generate work assignments that operate to move the items through an environment 100. However, it is contemplated that location information, including final location information of items, may be used by the dock management server 302 to perform other dock management functions. For example, in various embodiments, the final location of one or more items may be used by the dock management server 302 to generate door assignments for transportation vehicles. Consider, for example, FIG. 7.

Figure 7:
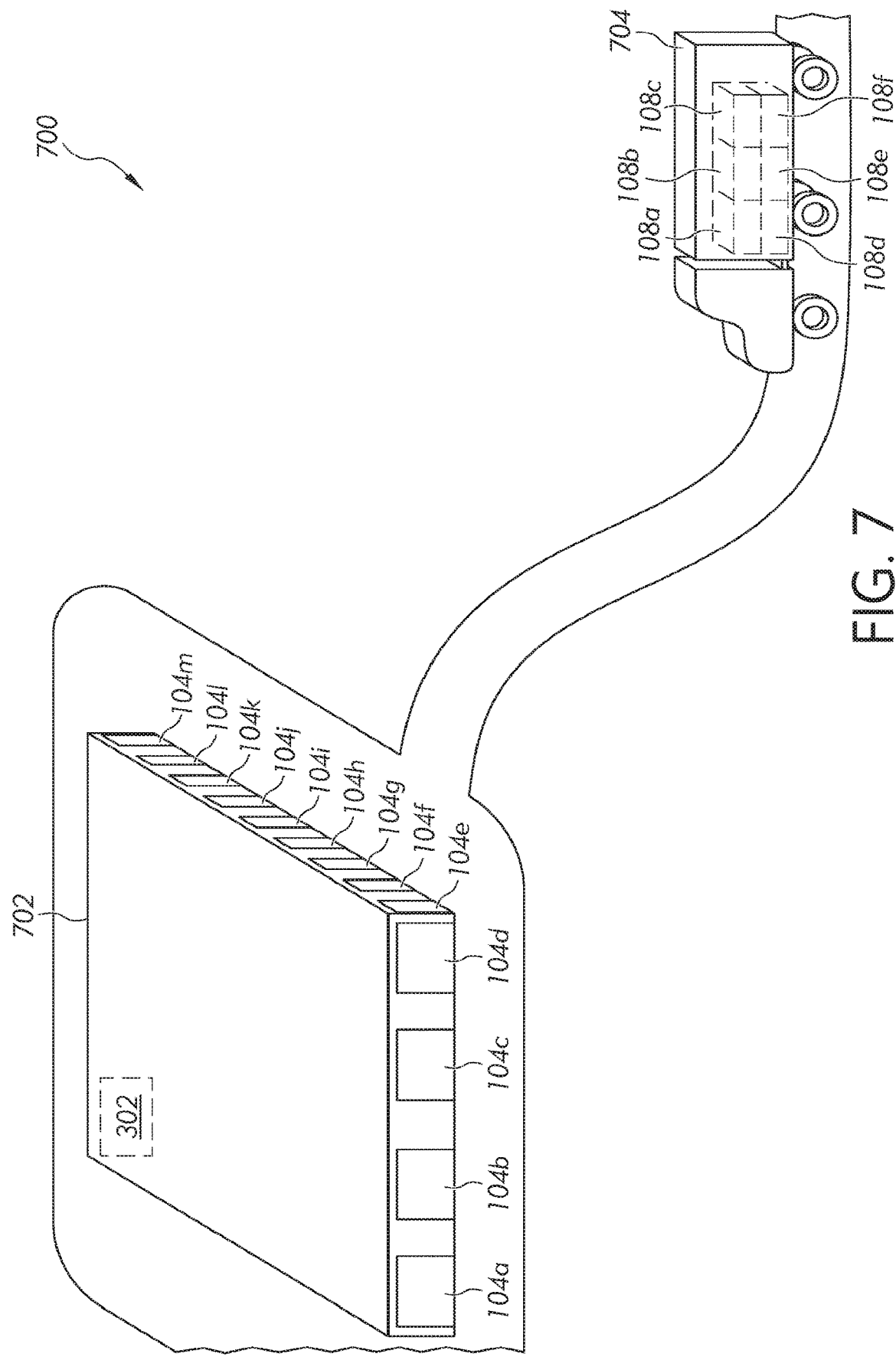
FIG. 7 schematically depicts an example situation in which a transportation vehicle is approaching an environment that includes a dock management server in accordance with one or more embodiments.

FIG. 7 schematically depicts an example situation in which a transportation vehicle 704 is approaching an environment 702 that includes a dock management server 302. The environment 702 may be, for example, a distribution center or warehouse. The transportation vehicle 704 includes a plurality of items 108a, 108b, 108c, 108d, 108e, and 108f loaded thereon that, once delivered to the environment 702 will be unloaded and loaded onto other transportation vehicles (not shown in FIG. 7). The transportation vehicle 704 includes a mobile computing device 304 (not shown) which is communicatively coupled to the dock management server 302. The dock management server 302 is configured to manage the route for the transportation vehicle 704 and provide various pieces of information to the mobile computing device 304, including but not limited to, a dock door assignment. More particularly, as the transportation vehicle 704 approaches the environment 702, the dock management server 302 provides the mobile computing device 304 with information regarding which dock door (104a-104m) the transportation vehicle 704 should arrive at for unloading of the items 108a-108f. In various embodiments, the dock management server 302 may generate a dock door assignment for the transportation vehicle 704 based at least in part on a centroid that corresponds to an average location for the final location for each item 108a-108f within the environment 702.

Accordingly, in various embodiments, the dock management server 302 receives information regarding a final location for each item 108a-108f. The information may be received, for example, from the mobile computing device 304 of the transportation vehicle 704, or the information may be received from another database or computing device communicatively coupled to the dock management server 302. For example, information regarding the final location for each item may be received as part of an item's itinerary or one or more shipping rules associated with each item. In various embodiments, the information regarding the final location for each item may be information regarding a next transportation vehicle onto which the item is to be loaded, such as a trailer heading to Chicago, a trailer heading to Denver, or a trailer heading to New York. In some embodiments, the information regarding the final location may include a dock door assignment for the next transportation vehicle onto which the item is to be loaded.

Figure 8:
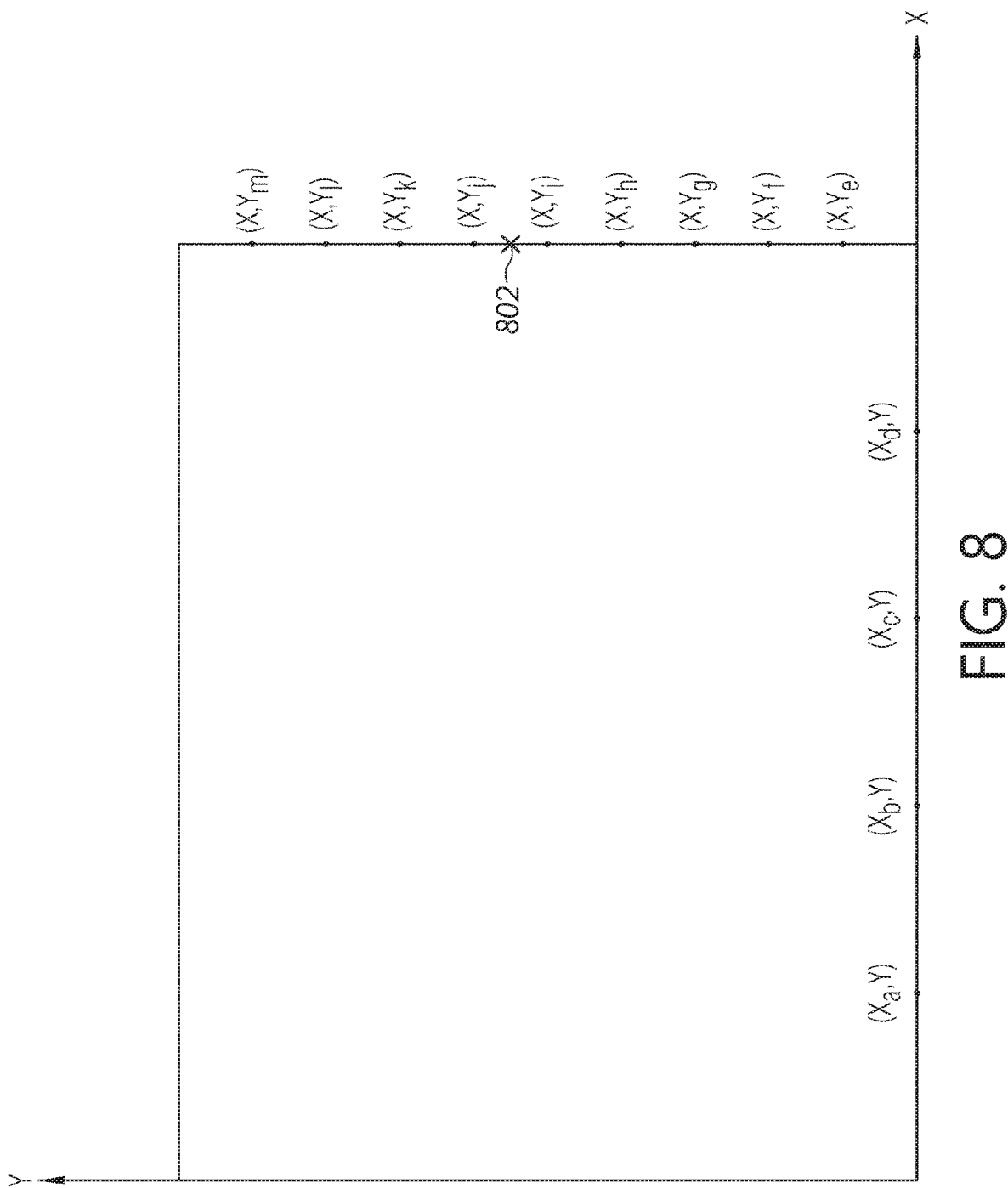
FIG. 8 schematically depicts an environment overlaid on an X-Y coordinate axis in accordance with one or more embodiments.

Based on the final location of each item 108a-108f, the dock management server 302 calculates a centroid that corresponds to an average location for the final location for each item 108a-108f. In various embodiments, the dock management server 302 may calculate the centroid by using an (x,y) location that corresponds to each door to which the items need to be moved. For example, FIG. 8 depicts the environment 702 overlaid on an X-Y coordinate axis such that each door is associated with an (x,y) coordinate pair. In particular, dock door 104a in FIG. 7 corresponds to $(X_A,Y)$ in FIG. 8, dock door 104b in FIG. 7 corresponds to $(X_B,Y)$ in FIG. 8, dock door 104c in FIG. 7 corresponds to $(X_C,Y)$ in FIG. 8, dock door 104d in FIG. 7 corresponds to $(X_D,Y)$ in FIG. 8, dock door 104e in FIG. 7 corresponds to $(X,Y_E)$ in FIG. 8, dock door 104f in FIG. 7 corresponds to $(X,Y_F)$ in FIG. 8, dock door 104g in FIG. 7 corresponds to $(X,Y_G)$ in FIG. 8, dock door 104h in FIG. 7 corresponds to $(X,Y_H)$ in FIG. 8, dock door 104i in FIG. 7 corresponds to $(X,Y_I)$ in FIG. 8, dock door 104j in FIG. 7 corresponds to $(X,Y_J)$ in FIG. 8, dock door 104k in FIG. 7 corresponds to $(X,Y_K)$ in FIG. 8, dock door 104l in FIG. 7 corresponds to $(X,Y_L)$ in FIG. 8, and dock door 104m in FIG. 7 corresponds to $(X,Y_M)$ in FIG. 8.

By way of example, assume that the transportation vehicle 704 includes item 108a which will be loaded onto a transportation vehicle at dock door 104m, item 108b which will be loaded onto a transportation vehicle at dock door 104e, and item 108b which will be loaded onto a transportation vehicle at dock door 104k. The dock management server 302 calculates a centroid based on $(X,Y_M)$, $(X,Y_E)$, and $(X,Y_K)$. For this example, the centroid 802 is located at a point between $(X, Y_I)$ and $(X,Y_J)$.

The dock management server 302 also receives information regarding a plurality of available loading doors. In particular, the dock management server 302 may receive a list of dock doors 104 that do not have a transportation vehicle assigned to them. Continuing the example from above, assume that the dock management server 302 receives a list that indicates that dock door 104i and dock door 104j are available for unloading.

The dock management server 302 then calculates a distance between each of the available unloading doors (in this example, 104i and 104j) and the centroid 802. In various embodiments, the dock management server 302 may calculate the distance between each of the available unloading doors and the centroid on an iterative basis (e.g., dock door 104i, then dock door 104j, and so on). The distance between each of the available unloading door and the centroid may be stored in an ordered list along with each available unloading door. In various embodiments, the dock management server 302 may generate a dock door assignment for the transportation vehicle 704 by identifying the dock door with the shortest distance between the dock door and the centroid. For example, the dock management server 302 may determine that the distance between dock door 104*j* and the centroid 802 is slightly less than the distance between dock door 104*i* and the centroid 802 and generate an assignment of dock door 104*j* for the transportation vehicle 704. The dock management server 302 may then transmit the door assignment to the mobile computing device 304 of the transportation vehicle 704.

In various embodiments, such as embodiments in which two available dock doors are the same distance from the centroid 802, the dock management server 302 may additionally calculate the sum of the distances from each of the available unloading doors (e.g., dock doors 104*i* and 104*j*) to the final location for each item (e.g., $(X,Y_M)$, $(X,Y_E)$, and $(X,Y_K)$). The sum may, in some embodiments, additionally be stored in the ordered list with the centroid and unloading door. In embodiments, the total sum may be referred to as the "cost" of the door. The dock management server 302 may determine the cost for each available door on an iterative basis, continuing determining the cost for each available door in the list until there are no additional available doors to be processed. The dock management server 302 may then assign the transportation vehicle 704 to the door with the lowest cost.

It is contemplated that other factors may be considered by the dock management server 302 when generating a dock door assignment. For example, in some embodiments, the dock management server 302 may consider the time of arrival of the transportation vehicle, the direction from which the transportation vehicle is arriving, the priorities of one or more items on board the transportation vehicle, shipping rules associated with items on board the transportation vehicle, or the like.

Various embodiments enable work assignments to be automatically generated and transmitted to the worker. Accordingly, worker efficiency can be increased or even maximized while the distance traveled by each worker is minimized, and real-time adjustments may be made to account for worker efficiencies. Moreover, by minimizing the distance traveled by the workers, transportation vehicles may be unloaded faster, resulting in an increased efficiency for the transportation vehicles. Additionally, various embodiments enable work assignments to be automatically updated responsive to a change in worker efficiency or location.

It should now be understood that the systems and methods described herein may be used to generate and transmit work assignments that minimize a total distance traveled by a worker and his mobile computing device. Further, systems and methods described herein may be used to generate dock door assignments for transportation vehicles based on a centroid that corresponds to an average location for the final location for each item in the load of the transportation vehicle. These determinations may be made at least in part on received location information for mobile computing devices. By basing the work assignments and dock door assignments at least in part on location information, including the total distance traveled by a worker and the locations of mobile computing devices coupled to the dock management system, the dock management system is able to more efficiently determine the most suitable work assignment and dock door assignment for a worker or transportation vehicle and increase the overall efficiency of the environment, which in turn may result in a decrease in the computing power used by the dock management system and associated devices.

While particular embodiments and aspects have been illustrated and described herein, various other changes and modifications may be made without departing from the spirit and scope of the claimed subject matter. For example, various steps in the methods depicted in the figures may be performed in various orders. Moreover, although various aspects have been described herein, such aspects need not be utilized in combination. It is therefore intended that the appended claims cover all such changes and modifications that are within the scope of the claimed subject matter.

What is claimed is:

1. A dock management system comprising:
   a dock management server;
   a transportation vehicle; and
   a mobile computing device incorporated within the transportation vehicle, wherein the dock management server is configured to:
   receive from the mobile device information regarding a final location for each item in a plurality of items, the final location being a dock door assignment of a subsequent transportation vehicle on to which each item is to be moved;
   calculate a centroid corresponding to an average location for the final location for each item in the plurality of items;
   receive information regarding a plurality of available loading doors;
   calculate a distance between a first of the plurality of available loading doors and the centroid;
   generate a door assignment for the transportation vehicle corresponding to the plurality of items based on the distance between the first available loading door of the plurality of available loading doors and the centroid, wherein generating the door assignment comprises processing, on the dock management server, computer readable instructions that operate to minimize a total distance traveled by the plurality of items from the door assignment to the final location;
   transmit the door assignment to the mobile computing device; and
   control movement of the transportation vehicle in response to the door assignment.

2. The dock management system according to claim 1, wherein generating the door assignment based on the distance between the first available loading door and the centroid comprises determining that the distance between the first available loading door and the centroid is less than a distance between a second available loading door of the plurality of available loading doors and the centroid.

3. The dock management system according to claim 1, wherein the information regarding the final location for an item comprises a location of a door corresponding to the subsequent transportation vehicle onto which the item will be loaded.

4. The dock management system according to claim 3, wherein the location of the door comprises an (x,y) coordinate pair for the door.

5. The dock management system according to claim 1, wherein generating the door assignment comprises iteratively determining a distance between the centroid and each of the available loading doors of the plurality of available loading doors.

6. The dock management system according to claim 1, wherein:
   the mobile computing device comprises a display; and the dock management server is configured to automatically activate the display of the mobile computing device in response to the door assignment to display the door assignment.

7. The dock management system according to claim 1, wherein the dock management system is configured to receive an updated final location for an item and generate an updated door assignment based on the updated final location for the item.

8. The dock management system according to claim 1, wherein:
the dock management system is configured to generate a work order assignment in response to the door assignment; and
transmit the work order assignment to a second mobile computing device.

9. The dock management system according to claim 1, wherein the mobile computing device comprises a scanner, wherein the mobile computing device is configured to scan the plurality of items and the final location of each item to the dock management server.

10. The dock management system according to claim 9, wherein the scanner includes an RFID receiver configured to receive signals from RFID transmitters associated with the plurality of items.

11. The dock management system according to claim 1, further comprising:
an autonomous forklift configured to autonomously transport the plurality of items to the transportation vehicle.

* * * * *